July 5, 1966   W. G. MUNDAY ETAL   3,259,418
QUICK RELEASE TOW HOOK
Filed March 27, 1964   3 Sheets-Sheet 1
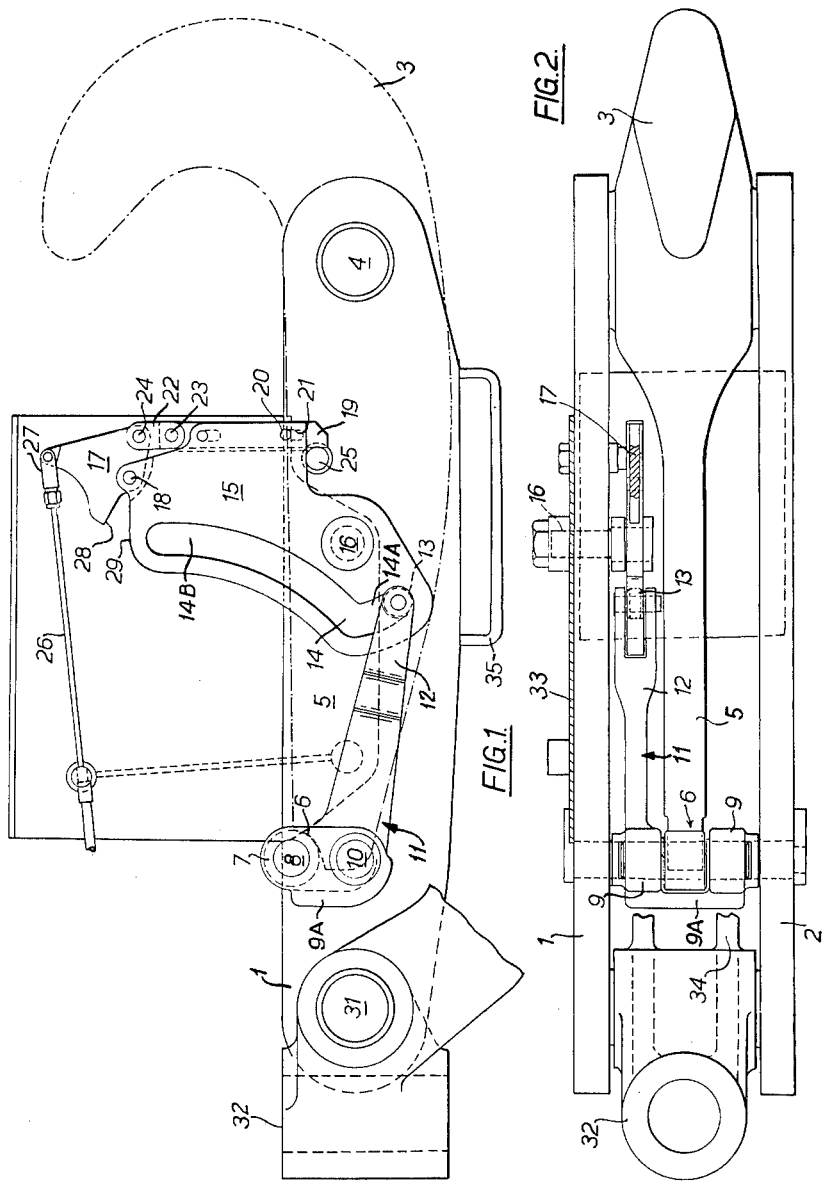
Inventors:
WILLIAM GEORGE MUNDAY
LESLIE JOHN HUEBNER
BY Baldwin & Wight, Attorneys July 5, 1966   W. G. MUNDAY ETAL   3,259,418
QUICK RELEASE TOW HOOK Filed March 27, 1964   3 Sheets-Sheet 2

Inventors:
WILLIAM GEORGE MUNDAY
LESLIE JOHN HUEBNER
By Baldwin & Wight, Attorneys

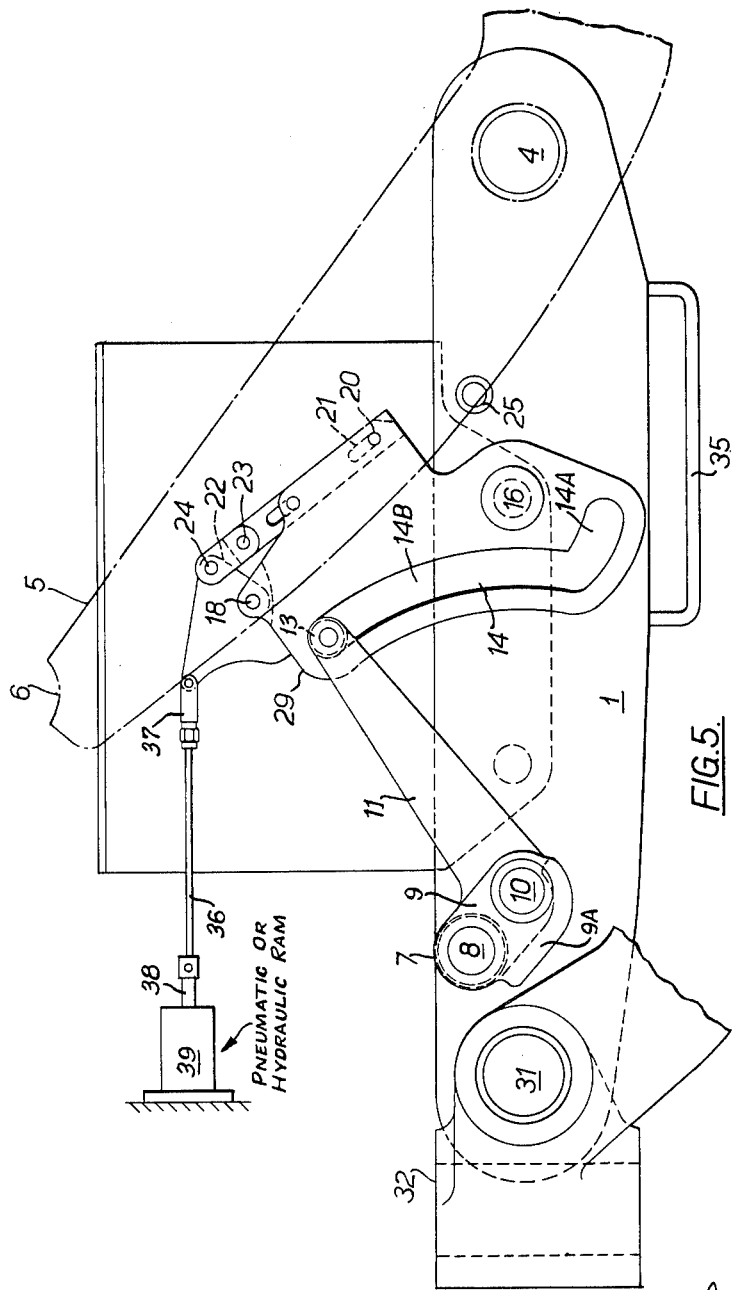

United States Patent Office 3,259,418
Patented July 5, 1966

3,259,418
QUICK RELEASE TOW HOOK
William George Munday and Leslie John Huebner, Pontypridd, Glamorgan, Wales, assignors to Brown, Lenox & Company Limited, Pontypridd, Glamorgan, Wales, a corporation of the United Kingdom
Filed Mar. 27, 1964, Ser. No. 355,336
Claims priority, application Great Britain, Apr. 26, 1963, 16,620/63
7 Claims. (Cl. 294—83)

This invention relates to quick release tow hook assemblies.

Quick release tow hook assemblies are known of the type which comprise a tow bar including two side plates between which a two armed hook member is mounted for pivotal movement, the hook member having a hook on one arm,. and the other, or retaining other arm hook member, being arranged for engagement with a trip element comprising a trip lever, including a radius arm or arms pivotally mounted between the two side plates, and mounting a hook retaining member which, in its operative position, overlies the retaining arm of the hook member, and a release lever by which the trip element is operated.

The hook retaining member comprises a roller carried by spindle mounted on or between the free end(s) of the radius arm or arms, which roller is arranged to engage against a shoulder on the free end of the retaining arm of the hook member.

It was intended with a tow hook assembly of this constuction that the hook could be released with a lesser effort than that required in previously known hooks. While a great improvement was in fact achieved nevertheless it has been found that a fairly large effort was still required in order to release the hook.

It is the object of this invention still further to reduce the effort needed in order to release the hook.

This is achieved amongst other things by arranging that the forces acting upon the hook, when in use, will assist in the releasing action.

This was previously thought to be undesirable since it was thought it would tend to jeopardise the secure holding of the hook in its operative position. This, however, has been found not to be so with a hook provided with release mechanism in accordance with the present invention.

According to this invention, in a quick release tow hook assembly of the type described, the radius arm, or one of the radius arms is formed as the first arm of a bell crank lever, the second arm of which is arranged for cooperation with a guide on the release lever, the guide being arranged depending upon the position of the release lever, to hold the said second arm in a position in which it holds the radius arm or arms, and hence the hook retaining member carried thereby, in their operative postions, or to allow the said second arm to move to permit the radius arm or arms to swing so as to effect disengagement of the hook retaining member from the retaining arm of the hook member, in response to forces exerted on the hook retaining member by the retaining arm.

Preferably as is known the hook retaining arm, is provided with a shoulder which is engaged by a roller constituting the hook retaining member, but in accordance with this invention the shoulder is of arcuate form to correspond to the circumference of the roller.

The guide on the release lever, in accordance with one embodiment of this invention, comprises a slot having two arcuate portions, a first arcuate portion in which means, mounted on the second arm of the bell crank lever, engage, so as to hold said arm and hence the radius arm or arms, and the hook retaining member in their operative position, and a second arcuate portion in which the means engaging with the slot are free to move upon movement of the release lever to disengage said means from the first portion of the slot, the release lever being pivotally secured to one of the side plates, and the first arcuate portion of the slot describing part of a circle whose centre is the pivot point of the release lever, and the second arcuate portion being arranged, upon movement of the release lever to disengage the means on the second arm of the bell crank lever, from the first portion of the slot, to adopt a position in which it describes a part of a circle whose centre is the pivot point of the radius arm or arms.

The means on the second arm of the bell crank lever for engagement with the slot preferably comprise a roller mounted at the free end of the said second arm.

The release lever may if desired be provided with a locking safety mechanism. The release lever may either be arranged to be operated by a Bowden cable or the like secured thereto, or alternatively may be operated by an hydraulic or pneumatic ram.

The invention is further described below with reference to the accompanying drawings in which:

FIGURE 1 is a side elevation of a quick release tow hook assembly in accordance with this invention, showing the radius arms and hook retaining member in their operative position, with the hook ready for use.

FIGURE 2 is a plan view of the hook of FIGURE 1,

FIGURE 5 shows the position adopted by the parts of the assembly when the hook is released.

Figure 3:
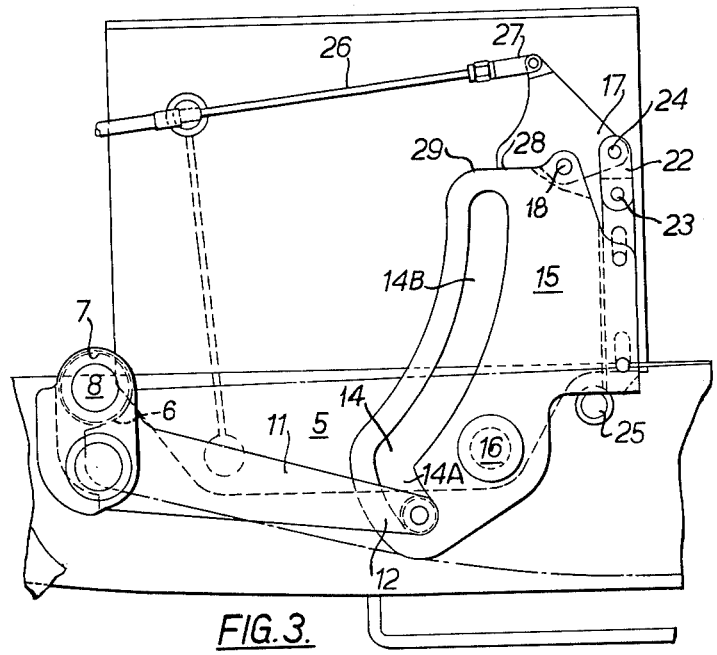
FIGURE 3 is a side elevation of the hook of FIGURES 1 and 2 showing the first stage in the operation for effecting release.
Figure 4:
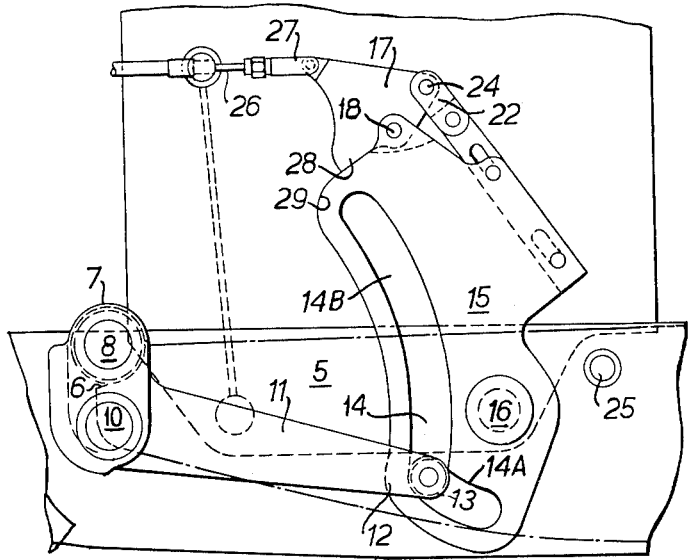
FIGURE 4 is a view similar to FIGURE 3 showing the next stage during the release.

Referring to the drawings a quick release tow hook assembly comprises a tow bar including two side plates 1 and 2 between which a two armed hook member 3 is pivoted at 4. A retaining arm 5 of the hook member is provided with a shoulder 6 of arcuate form for engagement with a roller 7 forming a hook retaining member which is pivotally mounted on a spindle 8 between the free ends of two radius arms 9 which are pivotally secured between the side plates at 10.

As best can be seen from FIGURE 2 one of the radius arms 9 constitutes one arm of a bell crank lever 11 the second arm 12 of which is bifurcated at its free end and mounts a roller 13 arranged to engage in a slot 14 forming a guide in a release lever 15 which is pivotally secured to the side plate 1 by a pivot 16. The release lever 15 is arranged to be operated by an operating lever 17 pivotally attached at 18 to the upper end of the release lever.

As shown in order to give them additional strength, the radius arms 9 are tied together by a member 9A, which is in fact, conveniently formed integrally with the radius arms. The member 9A also, of course, helps to relieve the forces that would act upon the spindle 8 upon movement of the radius arms by movement of the second arm 12 of the bell crank lever.

Locking or safety mechanism is associated with the release lever 15 and operating lever 17 in order to lock the lever 15 in the position in which it holds the hook member against release. This locking mechanism comprises a latch 19 having laterally projecting studs 20 arranged for engagement in slots 21 provided in the release lever. The latch is connected to the operating lever by a link 22 one end of which is pivoted at 23 to the latch, and the other end of which is pivoted at 24 to the operating lever. In the position shown in FIGURE 1 the lower extremity of the latch 19 engages a locking pin 25 secured to the side plate 1.

The operating lever 17 is arranged to be operated by a Bowden type cable 26 as shown in FIGURES 1 to 4, the cable 26 being secured to the operating lever 17 by a shackle 27. An alternative driving arrangement which is shown in FIGURE 5 will be described subsequently.

The operation of the tow hook assembly is as follows:

In the position shown in FIGURE 1, the hook member 3 is in its operative position where it is held against release. In this position the hook retaining member comprising the roller 7 overlies and engages with the arcuate shoulder 6 formed on the extremity of the retaining arm 5 of the hook member. The retaining roller 7 and radius arms 9 are held in this position by the second arm 12 of the bell crank lever 11, the roller 13 mounted at the free end of which arm, is engaged in a first portion 14A of the slot 14, thereby holding the arm 12 against pivotal movement about the pivot 10.

When it is required to release the hook member, the cable 26 is pulled so as first to cause the operating lever 17 to pivot about its pivot 18 to bring about raising of the latch 19, so that it clears the upper surface of the stop pin 25. This first stage of the release operation is illustrated in FIGURE 3. It will be noted that the movement of the operating lever, which brings about raising of the latch, also causes the surface 28 of the operating lever to abut the upper surface 29 of the release lever. Thus, the operating lever is locked against the release lever, and further movement of the cable will cause the operating lever and release lever to pivot as a unit about the pivot 16.

Pivotal movement of the release lever 15 causes the roller 13 on the extremity of the arm 12 of the bell crank lever to be disengaged from the first portion 14A of the slot 14. This occurs since the portion 14A describes part of a circle whose centre is the pivot 16. Once the roller 13 has reached the point shown in FIGURE 4 then, the forces acting on the hook, when under load, and which will tend to cause the hook member to rotate in a clockwise direction about its pivot 4, will take charge and since the radius arms are no longer held will cause them to pivot anticlockwise about the pivot 10 through the action of the arcuate shoulder 6 upon the roller 7, so as to cause this roller to be thrust clear of the shoulder, and allow the retaining arm 5 of the hook member to rise. This final stage of the release of the tow hook is illustrated in FIGURE 5. As the radius arms pivot anticlockwise about their pivot 10, the roller 13 on the arm 12, of course, rises in the second portion 14B of the slot 14. This movement of the arm 12 is made possible since when the release lever adopts the position in which the roller 13 is disengaged from the portion 14A of the slot, the portion 14B of the slot describes part of a circle whose centre is the pivot 10.

It will thus be appreciated, that whereas in the tow hook assembly of the previously known type steps were taken to ensure that the forces acting on the hook member did not tend towards release thereof, in the present invention the forces acting on the hook are, apart from the movement of the operating lever to raise the latch, wholly responsible for causing release of the hook. The result of this, of course, is that very considerably less force has to be applied to the operating lever and release lever in order to effect release of the hook, and indeed the effort required to effect release is of the ratio of 1 to 1,800 in relation to the load on the hook.

It will be noted that the two side plates 1 and 2 are secured by a horizontally arranged pivot 31 to a coupling 32, which is arranged to be secured, by a vertically arranged pivot, to for example a vessel to which the tow hook is attached. Also, a guard 33 is secured to the outside of the side plate 1 to protect the release mechanism.

A coupling 32 is provided with a support member, part of which is shown at 34, which member comprises two arms which mount at their free ends a foot member, not shown, arranged to rest on the deck of the vessel, or to slide in guides, provided thereon. Further, it will be noted, that the side plates on their lower surface, are provided with a buffer pad 35, which may, if desired, be covered with resilient material in order to cushion the shock which will occur, upon release of the tow, when the side plates will drop about their pivot 31 to come to rest upon the deck, or upon a further buffer pad arranged thereon.

It will be appreciated that the Bowden type cable 26 may be operated from any convenient station, either adjacent the tow hook assembly, or distant therefrom, for example, on the bridge of the vessel.

Further as already mentioned the Bowden type cable may be replaced by a pneumatic or hydraulic ram secured to the release lever and arranged remotely to be operated. Such an arrangement is shown diagrammatically in FIGURE 5, in which the Bowden type cable 26 is replaced by a link 36 secured to the operating lever 17 by a shackle 37. The link 36 is pivotally connected at its other end to the piston rod 38 of a pneumatic or hydraulic ram 39. Thus remotely controlled actuation of the ram 39 will operate the lever 17 in the required manner. If desired particularly when a ram is provided to operate the release lever, the locking mechanism described above may be dispensed with.

What is claimed is:

1. A quick release tow hook assembly comprising two side plates, a hook member, means for pivotally mounting said hook member between said side plates, said hook member having two arms, one of which forms a hook and the other arm being a retaining arm, and trip means including at least one bell crank lever having a first arm and a second arm, said first arm being a radius arm, means for mounting said radius arm between said two side plates, a hook retaining member carried by said radius arm and arranged normally to overlie said retaining arm of said hook member, a release lever to operate said trip means, said release lever having a slot therein, follower means for operatively connecting said slot to said second arm of said bell crank lever, and means for mounting said release lever for movement between a first position in which said slot maintains said bell crank lever in its operative position and a second position in which said slot allows disengagement of said hook retaining member from said retaining arm in response to forces exerted on said hook retaining member by said retaining arm.

2. A quick release tow hook assembly as claimed in claim 1, including a locking mechanism to hold said release lever, and hence said hook retaining member, said radius arm, and said bell crank lever in the operative position.

3. A quick release tow hook assembly as claimed in claim 1, including pneumatic ram means for operating said release lever.

4. A quick release tow hook assembly comprising two side plates, a hook member, means for pivotally mounting said hook member between said side plates, said hook member having two arms, one of which forms a hook and the other arm being a retaining arm, and trip means including at least one bell crank lever having a first arm and a second arm, a pivot mounting said bell crank lever between said two side plates, said first arm of the bell crank lever being a radius arm, a hook retaining member carried by said radius arm and arranged normally to overlie said retaining arm of said hook member, a release lever to operate said trip means, said release lever having a slot therein, follower means for operatively connecting said slot to said second arm of said bell crank lever, and means for mounting said release lever for movement between a first position in which said slot maintains said bell crank lever in its operative position and a second position in which said slot allows disengagement of said hook retaining member from said retaining arm in response to forces exerted on said hook retaining member by said retaining arm, said means for mounting the release lever including a further pivot carried by one of said side plates and said slot having a first arcuate portion describing part of a circle whose center is concentric with that of said further pivot, said follower means engaging within said first slot portion to hold said bell crank lever in its operative position, and said slot further having a second arcuate portion describing part of a circle whose center coincides with that of the pivot of the bell crank lever, so that upon movement of said follower means from the first arcuate portion to the second arcuate portion of the slot, the follower means is free to move along said second slot portion, thereby permitting unrestricted movement of the bell crank lever so that the hook retaining member will disengage from the retaining arm.

5. A quick release tow hook assembly comprising two side plates, a hook member, a pivot mounting said hook member between said side plates, said hook member including two arms, one arm forming a hook and the other being a retaining arm and having an arcuate shoulder on the free end thereof, and a trip mechanism including a bell crank lever having two axially spaced first arm portions and a second arm portion, means for mounting said bell crank lever for pivotal movement between said side plates, a first roller journalled on a bearing between said first arm portions and having rolling engagement with said arcuate shoulder, the arrangement being such that said first roller overlies said shoulder when said hook assembly is in an operative position, a release lever to operate said trip mechanism, said release lever having a slot therein with two arcuate portions, a second roller mounted at the free end of said second arm portion of said bell crank lever and arranged to cooperate with said slot, and a pivot journalled in one of said side plates to allow said release lever to pivot between a first position in which said second roller engages in said first arcuate portion of said slot to hold said bell crank lever and hence said hook retaining member in their operative positions and a second position in which said second roller moves from said first arcuate portion of said slot to said second arcuate portion, and said second arcuate portion moves into a position in which it describes part of an arc of a circle whose center is concentric with the means for mounting said bell crank lever, whereby said second roller is free to move in said second arcuate portion of said slot and thereby disengage said first roller from the arcuate shoulder on said retaining arm.

6. A quick release tow hook assembly as claimed in claim 5, and including a safety device to hold said trip mechanism in its operative position, which safety device comprises a locking pin secured to one of the side plates, a latch slidably mounted on said release lever, an operating lever, and pivot means for connecting said operating lever to said release lever, operation of said operating lever causing said latch to move into and out of engagement with said locking pin.

7. A quick release tow hook assembly as claimed in claim 5, and including a hydraulic ram to operate said release lever.

References Cited by the Examiner

UNITED STATES PATENTS

| | | | |
|---|---|---|---|
| 1,383,252 | 6/1921 | Wearham | 294—83 |
| 2,896,995 | 7/1959 | Stephens | 294—83 |
| 3,054,635 | 9/1962 | Voss | 294—83 |
| 3,061,355 | 10/1962 | Cozzoli | 294—83 |

FOREIGN PATENTS 10,861   7/1915   Great Britain.

GERALD M. FORLENZA, *Primary Examiner.*

HUGO O. SCHULZ, *Examiner.*

G. F. ABRAHAM, *Assistant Examiner.*